(12) United States Patent
Wei et al.

(10) Patent No.: US 8,341,299 B2
(45) Date of Patent: *Dec. 25, 2012

(54) REUSING SYSTEM CONFIGURATION INFORMATION AND METADATA FOR RELATED OPERATIONS

(75) Inventors: Shu-Shang Sam Wei, Danville, CA (US); Roger W. Kilday, Livermore, CA (US); Victor Spivak, San Mateo, CA (US); Meir Amiel, Pleasanton, CA (US); David Buccola, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,473

(22) Filed: Jan. 23, 2012

(65) Prior Publication Data
US 2012/0124097 A1    May 17, 2012

Related U.S. Application Data

(63) Continuation of application No. 12/005,143, filed on Dec. 21, 2007, now Pat. No. 8,131,884.

(51) Int. Cl.
*G06F 3/00* (2006.01)
*G06F 9/44* (2006.01)
(52) U.S. Cl. ............................. 710/5; 717/120
(58) Field of Classification Search .................. None
See application file for complete search history.

(56) References Cited

OTHER PUBLICATIONS

Yannis Kotidis and Nick Roussopoulos. 1999. DynaMat: a dynamic view management system for data warehouses. In Proceedings of the 1999 ACM SIGMOD international conference on Management of data (SIGMOD '99). ACM, New York, NY, USA, 371-382.*
Keidl, M.; Kreutz, A.; Kemper, A.; Kossmann, D.; , "A publish and subscribe architecture for distributed metadata management," Data Engineering, 2002. Proceedings. 18th International Conference on , vol., no., pp. 309-320, 2002.*
Susan Dart. 1991. Concepts in configuration management systems. In Proceedings of the 3rd international workshop on Software configuration management (SCM '91), Peter H. Feiler (Ed.). ACM, New York, NY, USA, 1-18.*
Symborski, C.W.; , "Updating software and configuration data in a distributed communications network," Computer Networking Symposium, 1988., Proceedings of the , vol., no., pp. 331-338, Apr. 11-13, 1988.*

* cited by examiner

*Primary Examiner* — Chun-Kuan Lee
*Assistant Examiner* — Dayton Lewis-Taylor
(74) *Attorney, Agent, or Firm* — Van Pelt, Yi & James LLP (57) ABSTRACT

Reusing system configuration information and metadata for related operations is disclosed. It is determined that a group of content management system commands may be treated as a related set for purposes of updating content management system configuration information and/or metadata. The content management system configuration information and/or metadata are updated once for purposes of processing the group.

21 Claims, 6 Drawing Sheets

REUSING SYSTEM CONFIGURATION INFORMATION AND METADATA FOR RELATED OPERATIONS

CROSS REFERENCE TO OTHER APPLICATIONS

This application is a continuation of U.S. patent application Ser. No. 12/005,143 entitled REUSING SYSTEM CONFIGURATION INFORMATION AND METADATA FOR RELATED OPERATIONS filed Dec. 21, 2007, now U.S. Pat. No. 8,131,884 issued on Mar. 6, 2012, which is incorporated herein by reference for all purposes.

BACKGROUND OF THE INVENTION

Content management solutions facilitate the creation, storage, retrieval, promotion (e.g., through a review/approval and/or other business process or work flow), retention, migration, and/or destruction of content, typically in the context of a relatively large body of content. A wide variety of regulatory and other legal and/or business requirements prescribe a manner and/or duration of retention of certain content. In some environments, large volumes of similar content objects, e.g., email messages or other communications, ecommerce or other transaction records, stock quotes, etc. must be ingested relatively quickly into a content management system. A content management system typically uses a database, such as a relational database management system (RDBMS), to store metadata associated with content items (e.g., documents or other files or objects) under management of the content management system. In a typical content management system, for each such content item that is added to a body of content being managed by the content management system one or more objects must be created and/or associated data stored (or updated) in a database. Typically, each such addition and/or update may require one or more database queries to ensure that system configuration information and/or metadata required to be known to perform operations such as inserting a new object are known and up-to-date. Examples of such system configuration and metadata include, without limitation, information regarding what the current version of an object to be updated is; what the object identifier for an object (or set of objects) identified by folder name, access control list (ACL) name, policy name, etc.; what is the default policy, logical storage location, etc. for objects of type X, associated with user Y, etc.; and are there any default customizations (e.g., custom methods, attributes) that apply to this object? Particularly when large numbers of content items are ingested and/or modified by a content management system in succession, the same questions may be asked of the database over and over again. Some benefits may be realized by caching responses, but each such cache would require maintenance and each might have its own and potentially different caching/refresh policy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Treating a group of content management system commands as a related set for purposes of updating content management system configuration information and/or metadata is disclosed. In some embodiments, a client application provides an indication that a group of content management system commands is associated with a single or related set of client application operations. In some embodiments, the client application or other process provides an explicit indication of the beginning and end of a group of content management system commands that are within the scope of a single client application or other operation and/or that otherwise may be treated as such for purposes of updating content management system configuration, metadata, and/or other information. Upon receiving an explicit and/or implicit indication that a group of content management system commands may be treated as related for purposes of updating content management system configuration and/or metadata, the content management system, in some embodiments optionally, only checks/updates at least certain content management system configuration information and/or metadata only once for the entire group, e.g., e.g., at the beginning of the group. In some embodiments, content management configuration information and/or metadata that is expected, desired, and/or required not to change across the group of content management system commands is updated once for the group. In some embodiments, such information is not updated at the beginning of a group and remains unchanged throughout the processing of the group.

Figure 1:
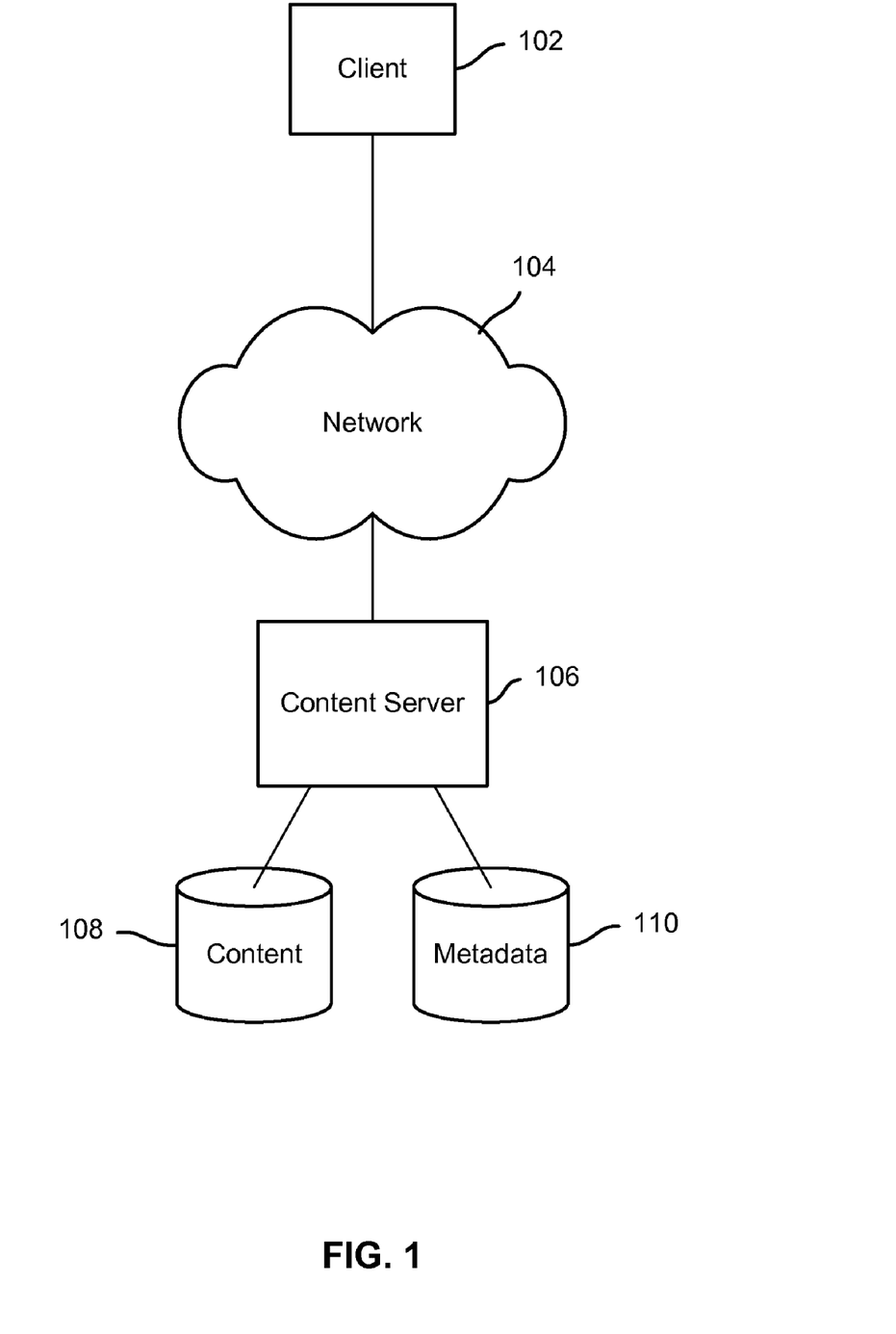
FIG. 1 is a block diagram illustrating an embodiment of a content management system.

FIG. 1 is a block diagram illustrating an embodiment of a content management system. One more clients 102 connect via a network 104 to a content server 106 configured to manage and provide access to body of content stored in a content store 108. For each content item in content store 108, corresponding metadata is stored in a metadata store 110. In some embodiments, each content item in content store 108 is represented in metadata stored in metadata store 110 by one or more objects configured to provide content management related functionality with respect to the content item. Data comprising each metadata object is stored in some embodiments in one or more database table, e.g., in a relational database management system (RDBMS). In some embodiments a content management client on client 102 communicates with content server 106 via network 104 to make content management related services available to applications running on client 102. In some embodiments, client applications on client 102 use a content management framework associated with the content management client to access content management related services. For example, such a client application may be configured to store a new content item (e.g., a document or other object) by invoking the content management client (or the server 106 directly) to create and save a new object, e.g., a new object configured and/or usable to save in content store 108 content data comprising the content item and/or to represent the content item in metadata 110. Similarly, to retrieve data, a client application and/or content management client would communicate with content server 106 via network 104. The client 102 may provide, for example, an identifier associated with a particular content item and/or one or more search criteria, such as a query to search for items created by a particular author on a specified date. In the case of retrieval of a specified content item, the content server 106 would use the provided identifier to retrieve the content item from the content store 108 and provide it to the client 102 via network 104. In the case of a query, the content server 106 would query database 110 to identify responsive objects. In some embodiments, metadata associated with responsive objects is sent via network 104 to client 102 where a user and/or process may select one or more responsive objects for retrieval.

In various embodiments, operations such as adding a new content item to content store 108, updating a content item and/or associated metadata, deleting a content item, etc. require the use of content management system configuration information and/or metadata stored in metadata store 110. In a typical prior art content management system, such dependencies could result in multiple successive iterations of the same database queries, once for each of a plurality of similar content items being ingested and/or other similar content management operations being performed, as may occur, for example, in circumstances in which many similar content items are being ingested in relatively rapid succession, such as to satisfy a requirement to archive email messages or other content in an enterprise or other environment. Even if such information were cached, successive iterations of the same content management operation may result in repetitive queries to verify that cached data is current, and/or could result in different system configuration information and/or metadata being used to perform content management commands that are related to one another, e.g., because they are part of the same client application operation. To alleviate these shortcomings, treating a group of content management system commands as a related set for purposes of updating content management system configuration and/or metadata is disclosed.

Figure 2A:
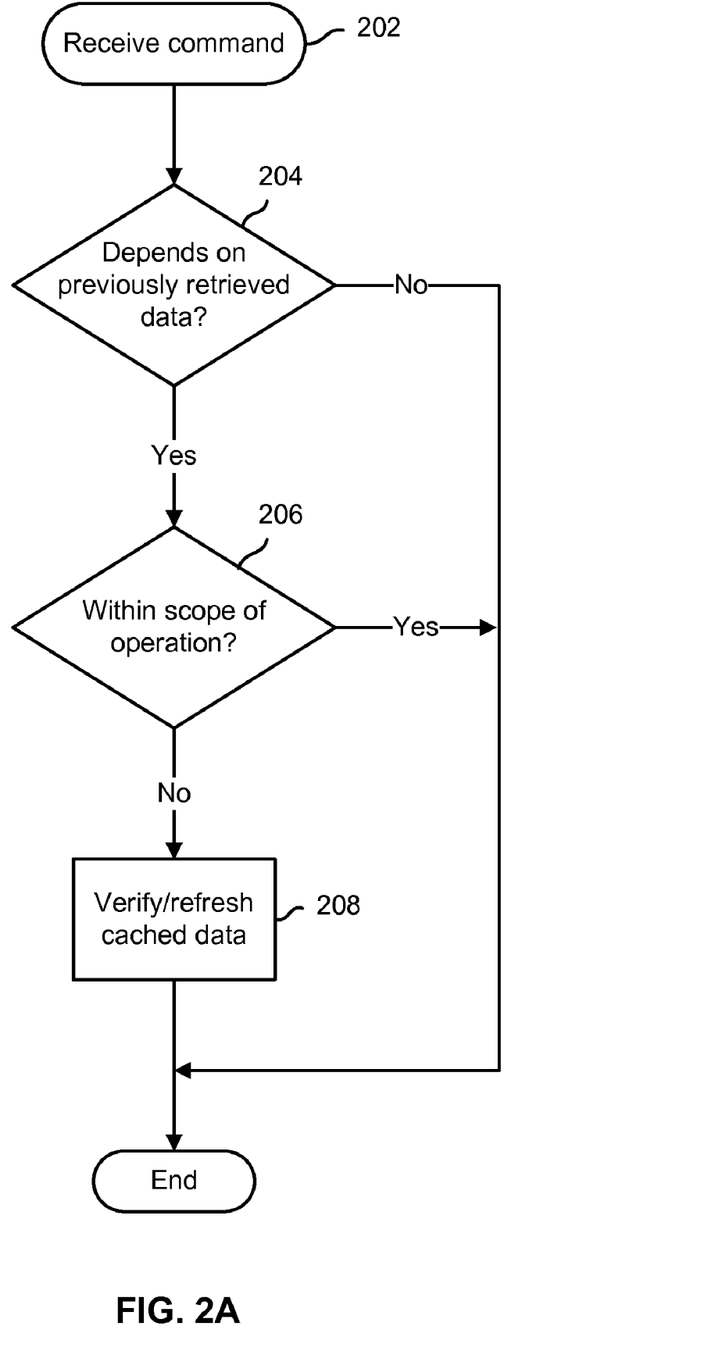
FIG. 2A is a flow chart illustrating an embodiment of a process for treating a group of content management system commands as a related set for purposes of updating content management system configuration information and/or metadata.

FIG. 2A is a flow chart illustrating an embodiment of a process for treating a group of content management system commands as a related set for purposes of updating content management system configuration information and/or metadata. When a command is received (202) it is determined whether the command depends on data retrieved previously from a database, such as system configuration information and/or metadata (204). If not, the command is performed without verify and/or refreshing (e.g., if needed) any cached system configuration information and/or metadata. If the command does depend on previously retrieved data (204), it is determined whether the command is part of a related group of commands (206). The term "scope" is used herein to refer to the boundaries of a client application operation and/or set of operations within which content management system commands may be treated as related for purposes of updating content management system configuration and/or metadata. If a command is determined to be within the same scope of operation(s) as one or more others (206), for example because an explicit "begin scope" indication has been received and no "end scope" indication has yet been received, any content management system configuration and/or metadata on which the command depends is not updated/refreshed, and previously retrieved and cached values are used. If the command is not within the same scope of operation(s) as one or more other commands (206), the system configuration information and/or metadata on which it depends is checked, and if necessary refreshed, e.g., prior to performing the command (208).

Figure 2B:
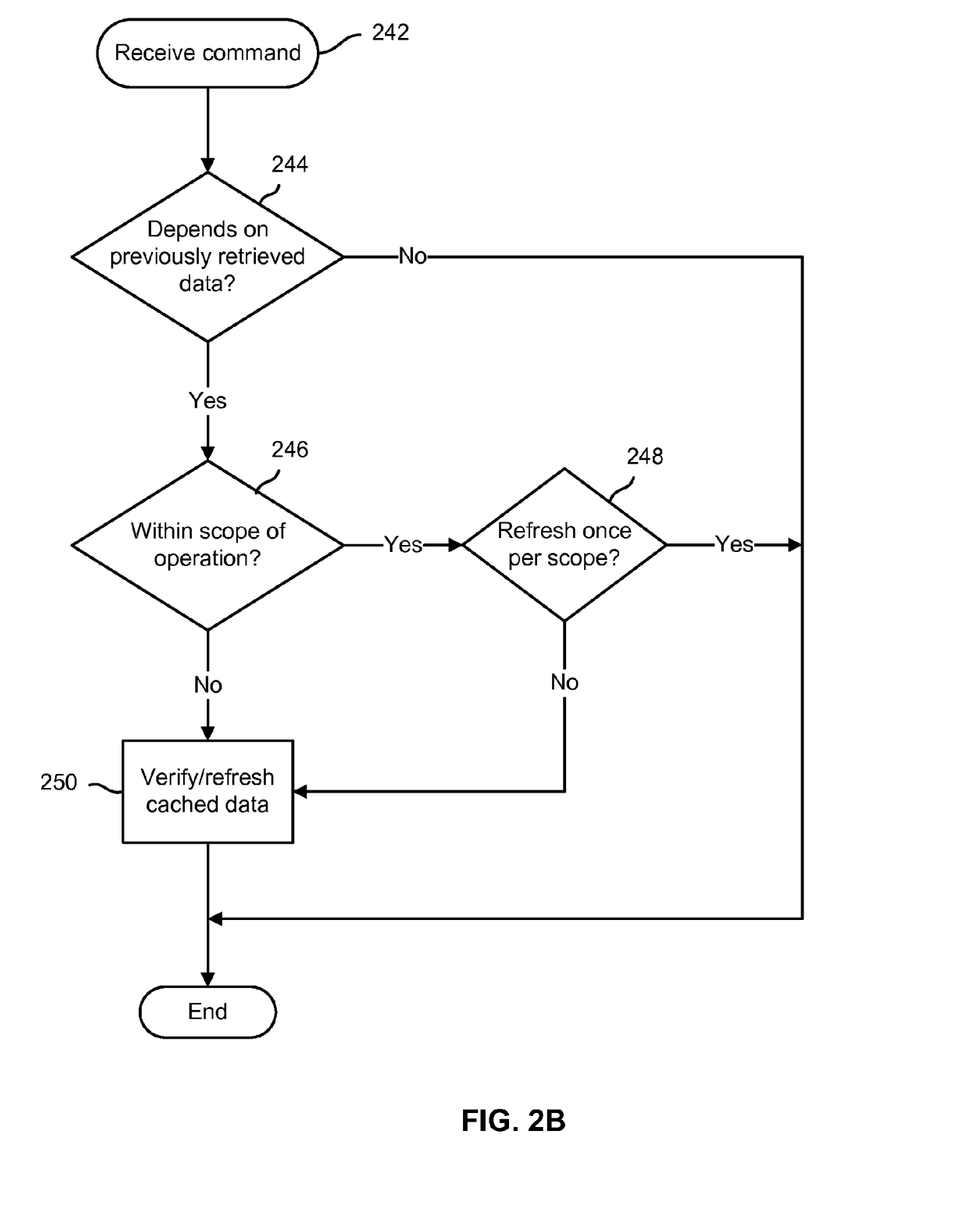
FIG. 2B is a flow chart illustrating an embodiment of a process for treating a group of content management system commands as a related set for purposes of updating content management system configuration information and/or metadata.

FIG. 2B is a flow chart illustrating an embodiment of a process for treating a group of content management system commands as a related set for purposes of updating content management system configuration information and/or metadata. In the example shown, steps 242, 244, 246, and 250 are the same as corresponding steps 202, 204, 206, and 208, respectively, of FIG. 2A. In the example shown in FIG. 2B, however, an application developer or other person, process, or entity may indicate, e.g., through user settings, flags or other data values, etc., whether content management system configuration information and/or metadata should be checked only once per scope, or instead in accordance with some other default and/or user-specified frequency and/or policy. In the example shown, if it is determined that a received content management command is within the same scope of operation as one or more other commands, a determination is made whether content management system commands within the same client application or other scope are to be treated as a related set for purposes of updating content management system configuration and/or metadata (248). For example, a user preference or setting is checked to determine whether updating cached data only once per scope has been indicated and/or enabled. If so, the command is performed without updating such content management system configuration information and/or metadata. If not (248), the system configuration information and/or metadata on which the received command depends is checked, and if necessary refreshed (250).

Figure 3:
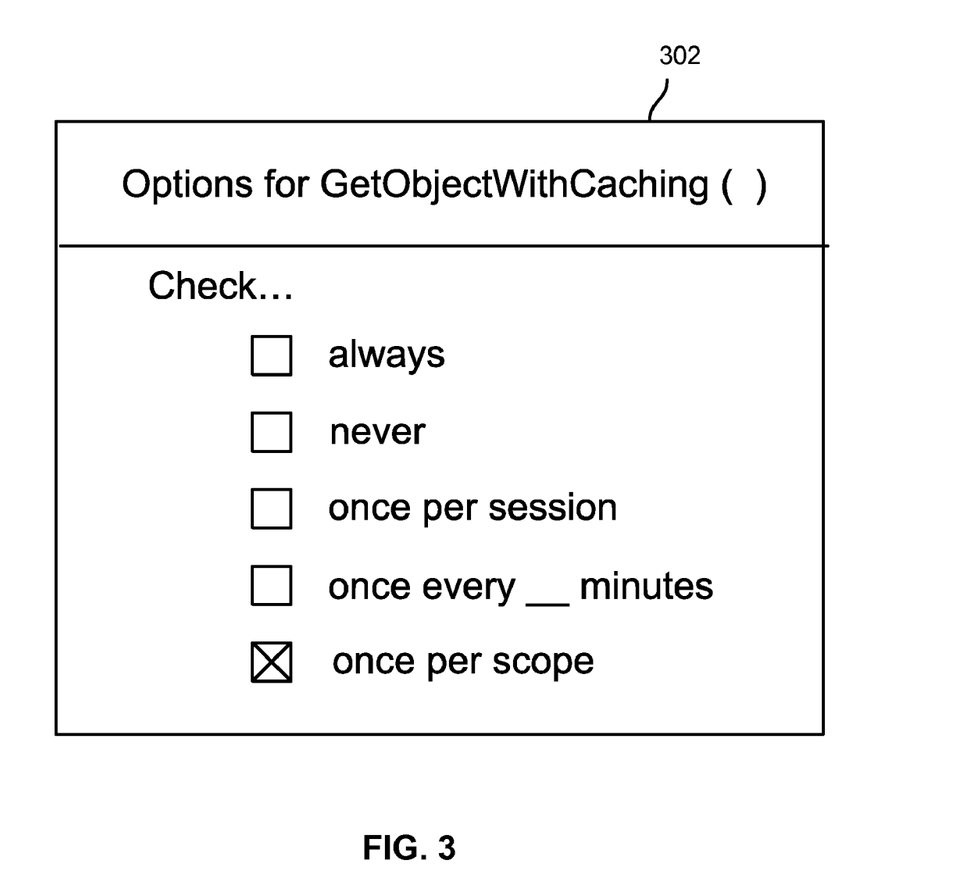
FIG. 3 is a block diagram illustrating an embodiment of an interface for indicating a preference that content management system commands comprising a related set of commands be treated as a group for purposes of updating content management system information and/or metadata.

FIG. 3 is a block diagram illustrating an embodiment of an interface for indicating a preference that content management system commands comprising a related set of commands be treated as a group for purposes of updating content management system information and/or metadata. In the example shown, interface 302 enables an application developer, system administrator, or other user to select an option for updating cached content management system information and/or metadata, in this example in the context of a command to retrieve an object with caching enabled. In some embodiments a similar interface is provided to select an option for checking cached information in the context of a query or other search, retrieval, and/or other operation. In the example shown, options are provided to indicated that cached content management system information and/or metadata should be checked (i.e., verified that cached data is current, and retrieve current data if needed) "always" (i.e., every time an object is requested); "never" (i.e., cached copy used without checking); "once per session" (e.g., once per content management system session, i.e., until log out, timeout, etc.); at a user-specified interval (here, in minutes); or "once per scope", as disclosed herein. In the example shown, the option to check cached content management system information and/or metadata "once per scope" has been selected. As a result, associated cached data would be checked only once (if at all) within a scope of operation(s), e.g., at the beginning of a scope of operation(s).

Figure 4:
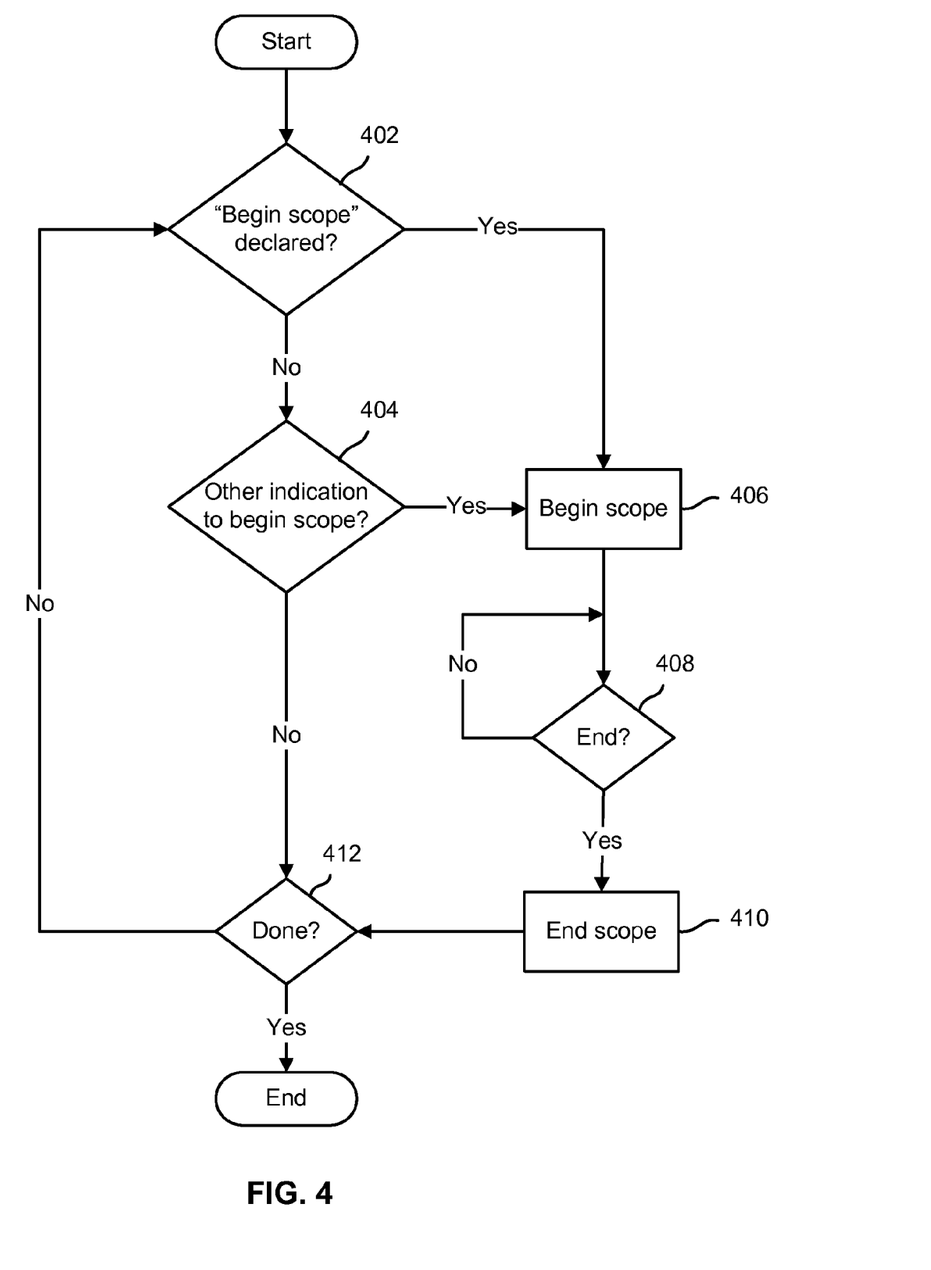
FIG. 4 is a flow chart illustrating an embodiment of a process for determining whether a group of content management system commands is related for purposes of updating content management system configuration information and/or metadata.

FIG. 4 is a flow chart illustrating an embodiment of a process for determining whether a group of content management system commands is related for purposes of updating content management system configuration information and/or metadata. In the example shown, if an explicit indication to "begin scope" is received (402) or another explicit or implicit indication to begin a scope of operation(s) is received (404) it is concluded that a scope of operation(s) has begun (406), such that content management commands received subsequent to the beginning of the scope and before an end of scope is indicated (408 and 410) are (or may, in an embodiment in which such treat is optional) be treated as a related set for purposes of updating content management system configuration and/or metadata. The process continues and repeated as applicable in subsequent iterations until done (412), e.g., on reaching the end of a session.

An example of an explicit indication to begin a scope of operation(s) follows:

```
begin scope
    create object 1
    save object 1
    create object 2
    save object 2
    ...
    create object n
    save object n
end scope
```

In some embodiments, the above set of commands would result in objects 1 through n being created and saved with content management system configuration information and/or metadata being updated only once per scope (if enabled and/or selected as an option, in some embodiments), for example, at the beginning of processing the set of create and save commands.

Examples of other indications to begin or end a scope include explicit indications provided for other purposes such as indications of the beginning or end of a database transaction, content management commands and/or operations that have been indicated as being suitable for treatment as a batch for more efficient database interaction, or any other express indication made potentially for other purposes that also indicates or suggests that a group of content management commands may be treated as a related set for purposes of updating content management system configuration information and/or metadata.

In some embodiments, one or more internal components of a content management system may be configured to retrieve objects, submit queries, and/or perform other tasks that may depend on content management system configuration information and/or metadata that is stored persistently in an associated database. In some such embodiments, such components may be configured and/or configurable to indicate that such content management system configuration information and/or metadata be checked once per client application scope. In addition, while within a scope of operation(s) a client application may provide an indication, explicitly or otherwise, to begin a scope of operation(s) prior to a pending scope having ended. To address such situations, in some embodiments nesting of scopes of operation is supported. In some embodiments, if a system administrator, application developer, or other user has indicated that nesting of scopes is permitted/enabled, an invoked content management system component or other code that would normally initiate the beginning of a scope will defer to and participate any existing scope that is pending already at the time the component or other code is invoked. For other components and/or code, by contrast, it may be important that potentially cached content management system configuration information and/or metadata be checked and, if necessary, refreshed at the time the component or other code executes, and for such components or other code nesting would be disabled beginning of a scope within a scope may result in content management system configuration information and/or metadata and, as a result, no guarantee is made that such content management system configuration information and/or metadata will not be checked and/or refreshed within a scope.

Figure 5:
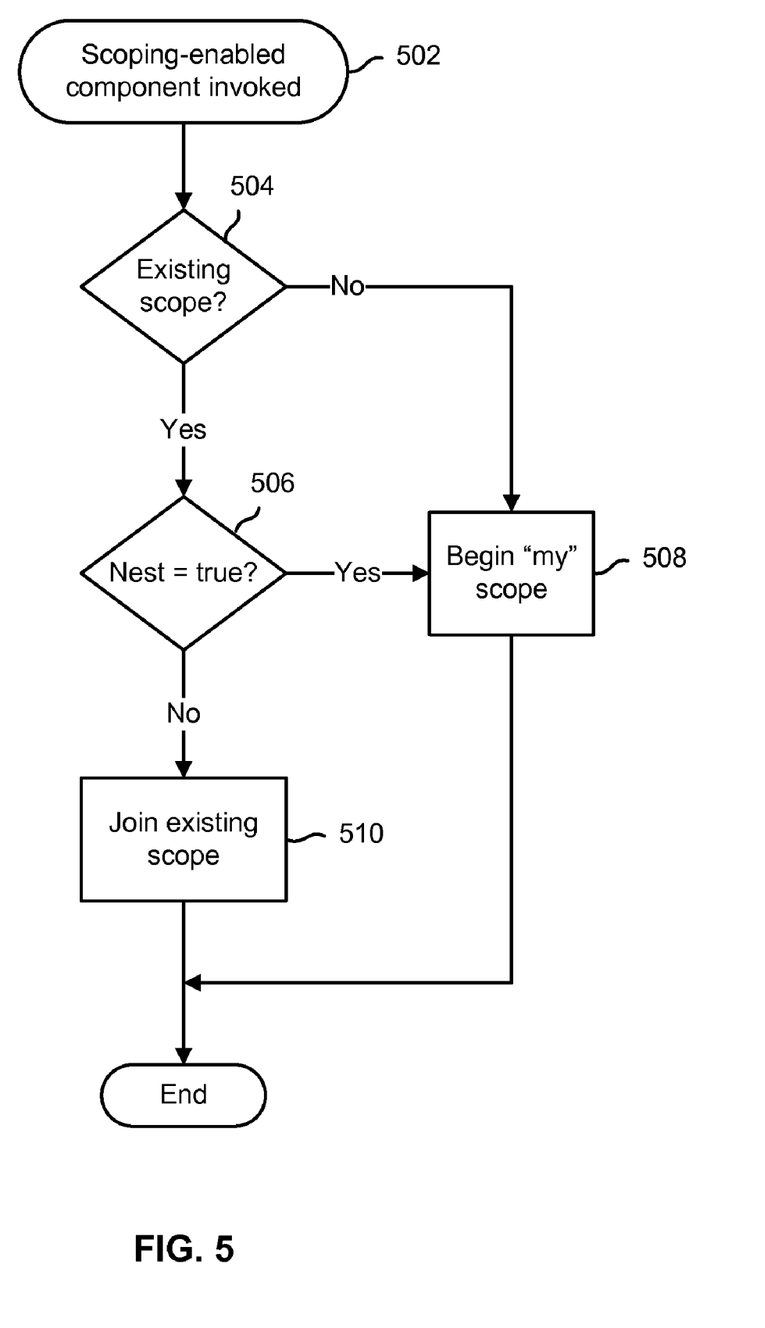
FIG. 5 is a flow chart illustrating an embodiment of a process for determining whether to nest scopes of operation(s).

FIG. 5 is a flow chart illustrating an embodiment of a process for determining whether to nest scopes of operation (s). In the example shown, when a scoping-enabled component (or other code) is invoked and/or executes (502), it is determined whether an existing scope of operation(s) is pending (504). If so and nesting of scopes is not indicated (506) the existing/pending scope is joined (510). In some embodiments, this results in the content management system configuration information and/or metadata on which the component (or other code) invoked at 502 not (necessarily) being checked and/or refreshed, for example if such data has already been checked at the beginning of the pending scope. If there is no pending scope (504) or if scope nesting is indicated (506), the invoked component begins its own scope (508) and any content management system configuration information and/or metadata on which the invoked component depends is checked once during that component's component specific scope.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing stored content, comprising:
grouping at a content management system a plurality of content management system commands into a related set for updating at least one of a content management system configuration information and a content management system metadata describing one or more content objects;
determining that the group of content management system commands operate on data previously cached by the content management system; and
updating at least one of the content management system configuration information or the content management system metadata by performing the group of content management system commands on the previously cached data, based at least in part on the determining.

2. The method according to claim 1, wherein the determining includes is checking whether the cache is to be refreshed.

3. The method according to claim 2, wherein the checking includes refreshing the cache always, once per a user session, once for the related set, once per a predetermined time interval, or once per a database transaction.

4. The method according to claim 3, wherein grouping and the refreshing the cache once for the related set are performed according to a predetermined grouping by scope.

5. The method according to claim 2, wherein the cache is refreshed before the updating is performed on at least a portion of the related set.

6. The method according to claim 1, further comprising grouping a plurality of content management system commands within the related set into a related subset.

7. The method according to claim 6, wherein the determining includes checking whether the cache is to be refreshed.

8. The method according to claim 6, wherein the checking includes refreshing the cache always, once per a user session, once for the related subset, once per a predetermined time interval, or once per a database transaction.

9. The method according to claim 8, wherein grouping and the refreshing the cache once for the related set are performed according to a predetermined grouping by scope.

10. The method according to claim 6, wherein the cache is refreshed before the updating is performed on at least a portion of the related subset.

11. A system for managing stored content, the system comprising a content server configured to:
group at a content management system a plurality of content management system commands into a related set for updating at least one of a content management system configuration information and a content management system metadata describing one or more content objects;
determine that the group of content management system commands operate on data previously cached by the content management system; and
update at least one of the content management system configuration information or the content management system metadata by performing the group of content management system commands on the previously cached data, based at least in part on the determining.

12. The system according to claim 11, wherein the content server is further configured to check whether the cache is to be refreshed.

13. The system according to claim 12, wherein the checking includes refreshing the cache always, once per a user session, once for the related set, once per a predetermined time interval, or once per a database transaction.

14. The system according to claim 13, wherein the content server is configured to group and the refresh the cache once for the related set according to a predetermined grouping by scope.

15. The system according to claim 12, wherein the content server is configured to refresh the cache before updating at least a portion of the related set.

16. The system according to claim 11, wherein the content server is further configured to group a plurality of content management system commands within the related set into a related subset.

17. The system according to claim 16, wherein the content server is further configured to check whether the cache is to be refreshed.

18. The system according to claim 16, wherein the checking includes refreshing the cache always, once per a user session, once for the related subset, once per a predetermined time interval, or once per a database transaction.

19. The system according to claim 18, wherein the content server is configured to group and the refresh the cache once for the related set according to a predetermined grouping by scope.

20. The system according to claim 16, wherein the content server is configured to refresh the cache before updating at least a portion of the related subset.

21. A computer program product for managing stored content, the computer program product being embodied in a non-transitory computer readable medium and comprising computer instructions for:
grouping at a content management system a plurality of content management system commands into a related set for updating at least one of a content management system configuration information and a content management system metadata describing one or more content objects;
determining that the group of content management system commands operate on data previously cached by the content management system; and
updating at least one of the content management system configuration information or the content management system metadata by performing the group of content management system commands on the previously cached data, based at least in part on the determining.

* * * * *